United States Patent [19]

Sikorski

[11] Patent Number: 4,674,613
[45] Date of Patent: Jun. 23, 1987

[54] ELECTRICALLY CONTROLLED TRANSMISSION SOFT SHIFTER

[75] Inventor: James F. Sikorski, Mentor, Ohio

[73] Assignee: Controlled Hydraulics, Inc., Mentor, Ohio

[21] Appl. No.: 809,257

[22] Filed: Dec. 16, 1985

[51] Int. Cl.$^4$ .............................................. F16D 25/14
[52] U.S. Cl. .................. 192/52; 137/625.64; 192/85 R; 192/109 F
[58] Field of Search ................. 192/109 F, 85 R, 52, 192/3.51, 3.58; 137/625.64; 74/405

[56] References Cited

U.S. PATENT DOCUMENTS

| | | | |
|---|---|---|---|
| 3,286,734 | 11/1966 | Hartshorne | 137/625.64 |
| 3,461,909 | 8/1969 | Vohringer | 137/625.64 X |
| 3,727,487 | 4/1973 | Forster et al. | 137/625.64 X |
| 3,856,047 | 12/1974 | Takayama | 137/625.64 X |
| 3,964,506 | 6/1976 | Grundman | 192/109 F X |
| 4,457,411 | 7/1984 | Hiramatsu | 192/3.58 X |
| 4,506,773 | 3/1985 | Schott | 192/52 |
| 4,553,732 | 11/1985 | Brundage et al. | 251/30.01 |
| 4,560,047 | 12/1985 | McCarthy et al. | 192/52 |
| 4,576,200 | 3/1986 | Janecke et al. | 137/625.64 X |

Primary Examiner—Rodney H. Bonck
Attorney, Agent, or Firm—Body, Vickers & Daniels

[57] ABSTRACT

An electrically controlled valve for automatically controlling the engagement of the clutch in heavy vehicle gear transmissions giving a "soft shifting" action. The position of a three way, three position, pressure actuated, directional valve is controlled by an electrically proportional and controlled relief valve which regulates the pressure on the directional valve. In the first position, the clutch is communicated to tank. In the second position, there is full flow to the clutch. In the third position, there is first a restricted flow to and then control of the pressure on the clutch by the relief valve.

5 Claims, 6 Drawing Figures

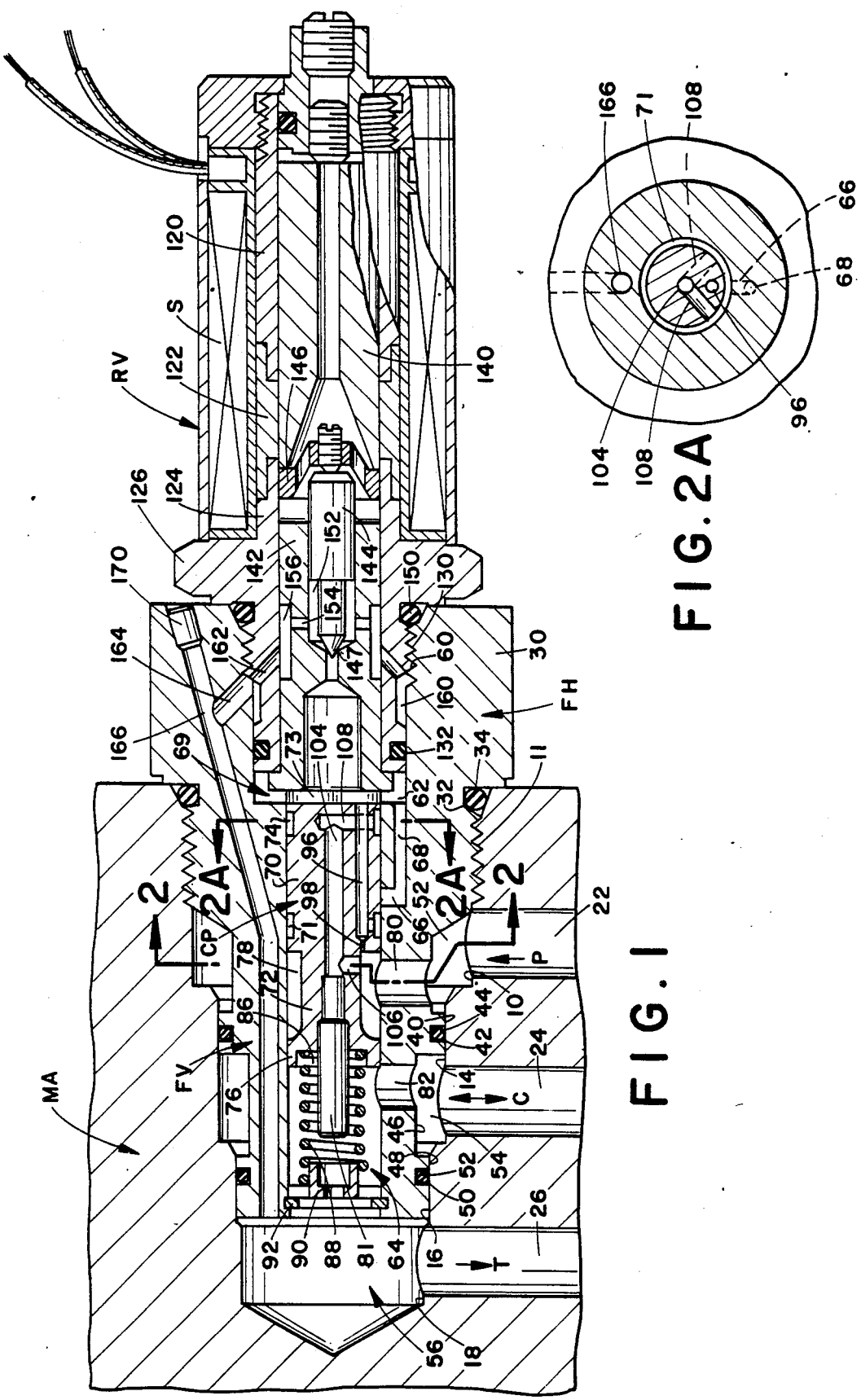

ELECTRICALLY CONTROLLED TRANSMISSION SOFT SHIFTER

BACKGROUND OF THE DISCLOSURE

This invention pertains to the art of hydraulics and more particularly to an electrically controlled directional flow and pressure control valve.

The invention is particularly applicable to the electrically controlled valves for automatically controlling the engagement of the clutch in shiftable gear transmissions used in automobiles, trucks, and heavy off-the-road equipment and will be described with particular reference thereto, although it will be appreciated that the invention has other and broader applications.

BACKGROUND OF THE INVENTION

Automobiles, trucks and heavy off-the-road equipment (hereinafter generically trucks) are normally powered by internal combustion engines which drive the vehicle through shiftable gear transmissions which enable wide variations in the ratio of speed of rotation of the engine to the speed of rotation of the wheels. Such transmissions require a clutch between the engine and the gears which clutch must be disengaged to enable shifting of the gears and then reengaged to drive the vehicle through the gears.

When the clutch is engaged, the driving clutch plate and the driven clutch plate are rotating at the same speed. Immediately after the gears are shifted, the driving and the driven clutch plates are usually rotating at widely different speeds. If the clutch plates are reengaged too quickly, there is an annoying jerk as the driving and driven clutch plates are brought rapidly into the same speed of rotation. Such jerk is annoying to the operator and can be damaging to the clutch and/or the gears.

For many years, the engagement of the clutch plates was usually controlled by the operator's foot, who would first rapidly bring the plates toward each other until they just touched and then slowly so that slippage would occur until the speed of the two plates comes into synchronism.

More recently, truck manufacturers have been tending to electro-hydraulic transmissions having hydraulically operated clutches where high pressure hydraulic fluid supplied to a piston moves the clutch plates against a spring bias into driving engagement. When the hydraulic pressure is low, the springs move the clutch plates apart a distance such that there is a gap between the two. After the gears have been shifted, hydraulic pressure moves the driven clutch plate across the gap and into pressure engagement with the driven clutch plate. To effectively do this, the truck manufacturers have asked that the driving clutch plate be moved quickly across the gap between the two plates until it is just in driving relationship with the driven clutch plate and then slowly into fuller pressure driving relationship. Slippage of the clutch plates occurs until the speed of the two plates is synchronized.

Further, the manufacturers have asked for a controllable final hydraulic pressure on the clutch plates so that the maximum torque before slippage occurs can be controlled. Thus by sensing the forces required to do a particular end function of the truck and converting the requirement to an electric signal, and it is possible to electrically control the final hydraulic pressure on the clutch.

This is known as "soft shifting".

Controlling both pressure on and flow rate of the hydraulic fluid to the clutch to effect this two speed reengagement has been a problem due not only to the timing requirements but, due to the high speed shifting of conventional electro-hydraulic valves. They result in a sudden and harsh clutch engagement, causing undue wear and a jerky motion of the vehicle.

One proposal is to use an electrically controlled on/off poppet valve which is oscillated or vibrated between an "on" and an "off" position by using pulse width modulated electrical energy to obtain an average pressure and/or flow rate which meets the requirements. This oscillation causes objectionable wear in the valve due to the continuous rapid movement of the various valve parts. Further, the electric circuitry to provide this two function approach is complicated and difficult to maintain in adjustment particularly with pulse width modulated electric power.

A further proposal is to use a pair of poppet valves, one of which controls and provides for a rapid approach of the driving clutch plate and a second poppet valve which controls the final and full engagement rate of the two clutch plates. The use of two valves is expensive, bulky and cumbersome in the operation.

THE INVENTION

The present invention provides an improved hydraulic valve which overcomes all the above referred to problems and others and provides with a single electrically controlled valve, the rapid approach of the clutch plates towards each other until they are almost or just in engagement and then a slow further engagement of the clutch plates until there is full engagement; and then a variable pressure control on the clutch plates to attain a final preload as required.

In accordance with the invention, there is provided a pressure actuated, three position, three way directional valve, having a spring biased first position where the pump is communicated to the inlet of an electrically proportional and controlled pressure regulating valve through an orifice and the clutch is communicated to tank; a second position where the pump is communicated fully to the clutch and to the valve through the same orifice; and a third position where the clutch and pump are each communicated through a restricted passage to the inlet of the valve which valve; when electrically unenergized, provides a first pressure insufficient to actuate the directional valve; when partially electrically energized, provides a second higher pressure sufficient to move the directional valve to its second position; and, when further, but variably energized, provides a third still higher, but variable pressure sufficient to move the directional valve to its third position and hold the clutch plates in engagement.

In the first position, the clutch is at zero or tank pressure and the clutch plates are biased apart by springs.

In the second position, there is full flow to the clutch at full pump pressure.

In the third position, there is a restricted flow from the pump to the valve inlet and a restricted flow from the valve inlet to the clutch until the plates are in engagement. Thereafter, flow essentially ceases and pressure on the clutch is the same as the relief valve inlet pressure. By then ramping up the energizing voltage, the pressure on the clutch plates can be ramped up at a controlled rate to a controlled maximum pressure on the opposite end. An orifice and the pressure regulating valve are in hydraulic series between the pump and tank such as to provide a variably but regulated pressure intermediate the pump and tank pressures at the outlet of the orifice which intermediate pressure is communicated to the pressure end of the control piston.

When the regulating valve is unenergized, the pressure drop across the orifice is such that the intermediate pressure approaches zero, i.e., it is insufficient to move the control piston against the spring bias.

When the pressure regulating valve is partially electrically energized, the intermediate pressure increases to a fixed regulated value proportional to the amount of energization which pressure forces the control piston against the spring bias to its second position where there is full flow from the pump to the clutch to provide rapid relative movement of the clutch plates.

When the pressure regulating valve is further electrically energized, the intermediate pressure further increases to a higher value sufficient to move the control piston to its third position where the flow to the clutch is from the intermediate pressure through a restricting orifice so that the plates move toward each other at a slower rate until in actual engagement when further flow substantially ceases. When flow through the orifice ceases, the pressure on the clutch rises to the intermediate pressure which is a function of the valve energizing voltage. By controlling the rate of ramping this voltage upwardly, a controlled increase in pressure between the clutch plates is easily obtained. By limiting the maximum energization, the maximum clutch pressure and thus the maximum torque before slippage occurs can be readily controlled.

More specifically, the control piston in all positions has an orifice communicating the pump pressure to its pressure surface and the regulating valve. Additionally, the control piston in its third position has a second restricted passage which communicates the clutch to the regulating valve inlet.

By an electrically proportional and controlled pressure relief or regulating valve is meant; a valve which (within the limits of its maximum volume handling capacity, determined by the size of its internal passages), automatically opens and closes to maintain the pressure at its inlet port constant, the maintained pressure being directly proportional to the electrical energization supplied to the valve.

Further in accordance with the invention, an electric power source and timer combination for the relief valve is provided, which supplies a first partial voltage for a predetermined time period, and then a higher time increasing (ramped) voltage for a predetermined time period whereby, when the relief valve is first energized, there is a substantial flow of fluid to rapidly bring the clutch plates into light engagement; and, then a substantially reduced (or zero) flow of fluid at an increasing but a controllable pressure to bring the clutch plates into a controlled pressure engagement.

OBJECTS

The principle object of the invention is the provision of the new and improved electrically controlled hydraulic valve for controlling the engagement of clutches in shiftable gear type transmissions which is simple in operation, economical to manufacture, and positive in operation.

Another object of the invention is the provision of a new and improved valve for controlling the clutch in gear transmissions which utilizes a single solenoid control module for each clutch to satisfy two functions—direction of flow and pressure sensing requirements.

Another object is the provision of a new and improved valve for controlling the clutch of a shiftable gear transmission which enables both a controlled initial rapid movement of the clutch plates and controlled final pressure engagement of the clutch.

Another object is the provision of a new and improved valve for controlling the clutch of a shiftable gear transmission which enables torque control by sensing forces required to do a particular function of the vehicle and converting these forces to an electric signal which can automatically vary pressures between the clutch plates.

Another object is the provision of an electrically controlled valve which enables the fast bringing together of the clutch plates and then a slow controlled increase in pressure between the plates.

Another object is the provision of an electrically controlled valve arrangement which enables a slow increase in pressure between the plates up to a controlable maximum.

PREFERRED EMBODIMENT

The invention may take physical form in certain parts and arrangements of parts, a preferred embodiment of which will be described in detail in this application and illustrated in the accompanying drawings which form a part hereof and wherein:

FIG. 1 is a cross sectional view of an electrically controlled directional and pressure control flow valve; illustrating a preferred embodiment of the invention;

FIGS. 2 and 2A are cross sectional views of FIG. 1 taken approximately on the lines 2—2 and 2A—2A.

Figure 4:
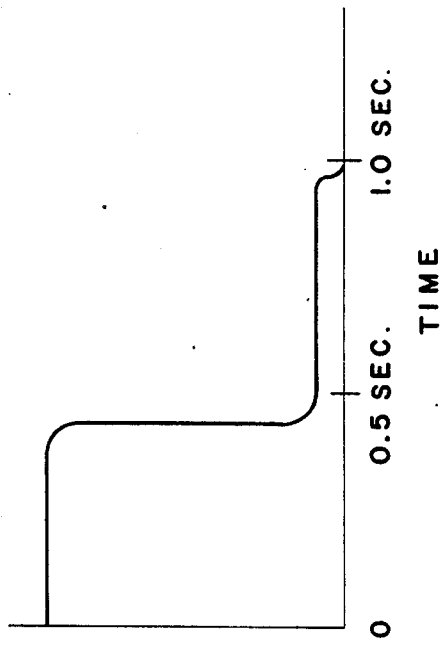
FIG. 4 is a plot of both clutch hydraulic pressure and source voltage vs. time; and, FIG. 5 is a plot of fluid flow vs. time.

Referring now to the drawings, wherein the showings are for the purpose of illustrating a preferred embodiment only and not for the purposes of limiting same, FIG. 1 shows a manifold MA, a three position, pressure actuated, directional valve FV, and an electrically proportional and controlled pressure regulating valve RV.

The manifold MA, is part of the transmission itself and forms no part of the present invention. It is comprised generally of a block of metal having a multi-diameter bore which reading from left to right includes; a first cylindrical surface 10 the right hand end of which is threaded as at 11; a second cylindrical surface 14 of lesser diameter; a third cylindrical surface 16 of still lesser diameter; and a fourth cylindrical surface 18 of still lesser diameter. Passage 22 communicates the pump (not shown) through surface 10. Passage 24 communicates the clutch (not shown) through the surface 14, adjacent to the left hand end thereof. Passage 26 communicates the tank (not shown) through surface 18.

Directional Valve

The valve FV is comprised generally of a housing FH and a control piston CP slidably supported therein.

The flow valve housing FH in the embodiment shown is comprised of a series of external cylindrical surfaces of progressively decreasing diameter which reading from right to left include; a first portion 30 of a diameter greater the diameter of surface 10; a second portion 32 in which a seal 34 engaging manifold MA is positioned; a third diameter 36 which is threaded to mate with threads 11; a fourth diameter 38 substantially less than the diameter of the threads 36; a fifth diameter 40, which has a groove 42 in its outer surface to receive an O-ring seal 44; a sixth cylindrical surface 46 of still lesser diameter than the cylindrical surface 48 which has a groove 50 to receive an O-ring seal 52.

The varying diameters on the outside of the flow valve housing FH coact with the bore in the manifold MA to provide a first chamber 52 which communicates with the passage 22 and thus the pump; a second chamber 54 communicating with the passage 24 and thus the clutch; and, a third chamber 56 which communicates with passage 26 and thus the tank.

The flow valve housing FH has an elongated cylindrical passage therethrough which reading from right to left is comprised of; a threaded bore 60 of a first diameter; a second bore 62 of a slightly lesser diameter; and a third bore 64 of a still lesser diameter which forms the cavity in which the control piston CP is slidably mounted.

Port 82 communicates an intermediate point of bore 64 to the clutch while port 80 to the right of port 82 communicates bore 64 to the pump. Port 66 still further to the right and passage 68 communicate the bore 64 an intermediate pressure chamber 69 formed by the inlet of valve RV and the right end of control piston CP.

The control piston CP is in the form of a spool having (reading from right to left); a first portion 70 of a diameter so as to be in sliding sealing engagement with the surface 64 and having a pair of spaced grooves 74, 71 initial surface and intermediate its ends; a second portion 72 of lesser diameter; and, a third portion 76 of the same diameter as portion 70 so as to be in sliding sealing engagement with the surface 64.

Portion 70 has a grooved right hand end 73 forming with valve RV the intermediate pressure chamber 69. End 73 forms a surface against which hydraulic forces to the left are developed as will appear.

The left hand end of the control piston CP has a shallow bore 86 into which a precision compression spring 88 extends. The left hand end of the spring 88 bears against a spring guide 90 held in place by a snap ring 92 mounted in a groove in the surface 64.

Spring 88 biases the control piston to the right and in this position end 73 engages the right hand end of valve RV and locates the piston CP relative to passages 80 and 82. Also, portion 76 forms a land separating the pressure in chamber 78 from the passage 82 leading to the clutch.

Portions 70, 72 and 76 form with surface 64 a closed flow chamber 78 of an axial length such that in the second position it overlaps ports 80 and 82, thus communicating the pump to the clutch.

A rod 81 extends from the left hand end of piston CP of a length to engage the spring guide 90 and position the piston relative to the ports in the third position. In this third position, portion 70 overlaps and closes port 80 while chamber 78 still communicates with port 82.

Portion 70 of the control piston CP has an axial passage 96 with an orifice 98 at the left hand end thereof restrictively communicating flow from the chamber 78 to the right hand end of the control piston CP. Orifice 99 restrictively communicates passage 96 with groove 71.

Piston CP also has an axial passage 104 communicating at its left end with the chamber 78 through a radial passage 106 and at its right end with groove 74 through a pair of radial passages 108. These passages are so sized e.g. 0.075 inches as to limit the flow of fluid to the clutch to 2 gallons per minute. Groove 74 in the first and second positions of the control piston CP is closed by the surface of bore 64. In the third position, groove 74 is communicated with the intermediate pressure chamber 69 through port 66 and intersecting axial passage 68.

While the diameters of orifices 98 and 99 may be varied to suit individual requirements, in the preferred embodiment, they have diameters of 0.312 and 0.083 inches, respectively.

Pressure Relief Valve

The specific details of the construction of the pressure relief or regulating valve RV are fully described in the co-pending application of Robert W. Brundage, Ser. No. 563,760, filed Dec. 21, 1983, and form no part of the present invention except in so far as the characteristics of such valve enable the successful operation of the present invention. The disclosure of such application of Brundage is incorporated herein by reference, such application being exclusively licensed to the assignee of this application.

For completeness, however, the valve will be generally described. It includes an elongated cylindrical housing comprising, and reading from right to left; a first cylindrical sleeve 120 of magnetically permeable material; a second cylindrical sleeve 122, of magnetically non-permeable material; and, a third sleeve 124 of magnetically permeable material which sleeve 124 is integral with a hexagonal portion 126; a cylindrical boss 128 threaded as at 130 to mate with the threads 60 of the flow valve housing FH; and, a portion 132 having a groove 134 in its outer surface in which an O-ring 136 is mounted in sealing engagement with the surface 62.

Slidably supported in the cavity formed by the sleeves 120, 122, and 124, is a magnetically permeable armature 140, the right hand end of which is in substantial overlapping relationship with the sleeve 120 and the left hand end of which has a conical cavity forming an outwardly tapered portion 142, the extreme left hand end of which slightly overlaps the right hand end of the sleeve 124.

Mounted in the left hand end of the portion 126, is a valve seat forming member 147; in which a valve piston 144 is slidably supported. In between the valve piston 144 and the armature 140 is a spacer member 146 against which the armature 140 abuts and this in turn, presses the valve piston 144 to the left against the valve seat 147. A sealing member 150 between the left hand end of the portion 120 and the right hand end of the flow valve housing FH provides in combination with the O-ring 132, a chamber 160 to which fluid flowing past valve seat 147 flows through space 152, passage 154, space 156, and passage 162.

The left hand end of valve RV and the bore formed by surface 160 form a closed pressure chamber 161 which is at an intermediate pressure proportional to the size of orifice 98 and the degree of opening of valve RV. This intermediate pressure exerts a hydraulic force to the left on control piston CP. This same intermediate pressure exerts a hydraulic force to the right on valve piston 144.

Chamber 160 is communicated with the tank through passage 164, passage 166 formed in the flow valve housing FH. The right hand end of passage 166 is closed by a "Stellite" seal 170. The left hand end of passage 166 opens to the left hand end of the flow valve housing FH and thus to the tank through passage 26.

The pressure regulating valve RV also includes a solenoid coil S surrounding the sleeves 120, 122, 124 which when energized, produces a magnetic force on the armature 140 tending to pull it to the right.

Operation

Control piston CP and valve housing FH form a three position three-way valve which in the first of the positions shown in the drawings communicates the clutch to tank through passage 24, chamber 54, passage 82, bore 86 chamber 56 and passage 26. The clutch will thus be at zero pressure and its springs will bias it open.

Also in this position fluid flows from the pump through passage 80, chamber 78, orifice 98, passage 96, intermediate pressure chamber 69 and valve RV to tank. Valve RV is unenergized and is fully open so that the pressure in chamber 69 is low. Also, in this position, groove 74 is closed by surface 64 so that no fluid flows through passage 104.

When the valve RV is electrically unenergized the pressure at its inlet end and intermediate pressure chamber 69 is essentially zero with the full pressure drop of the pump to the tank being across orifice 98. The control piston is in its full right hand position. In this position the clutch is communicated with the tank and the clutch plates are biases apart by springs.

Piston CP is moved against the bias of the spring 88 to the left to its second and third positions by hydraulic pressures on its right hand facing pressure surface 73 which pressures are controlled in chamber 69 by the electrical energization of the pressure relief valve RV.

In the second position, fluid flows from the pump freely through chamber 78 to the clutch. The passages are so sized as to give an eight gallon per minute flow at 200 psi pump pressure. Fluid also flows through orifice 98 to chamber 69 and the partially closed relief valve RV to the tank.

In the third position, fluid flows from the pump through orifice 99, passage 96, intermediate pressure chamber 69 and the now further closed valve RV. At the same time, the clutch is communicated to the chamber 69 through port 82, chamber 78, passages 106, 104, 108, groove 74, and passages 66, 68.

In this third position, there is first a decreased flow to the clutch with the passages and orifice being sized for two gallons per minute until the clutch plates are in actual engagement at which time there is no or minimal movement of the clutch plates and there is minimal flow with the pressure on the clutch being that of the intermediate pressure chamber 69 which pressure is determined by the energization of the solenoid of valve RV from a D.C. power source PS.

Power Source

Figure 5:
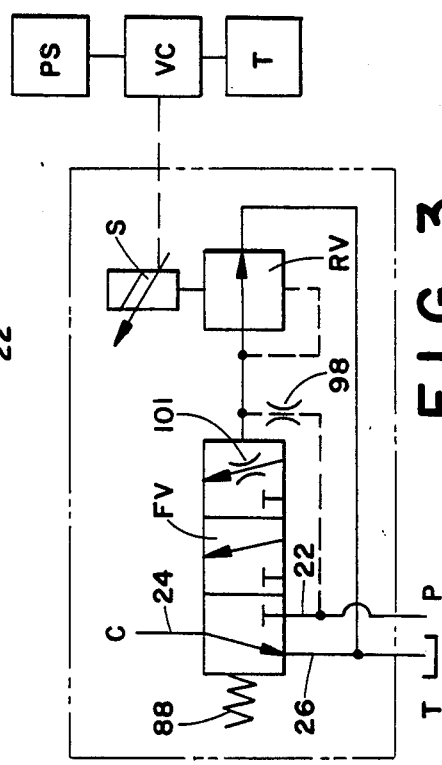
Figure 2:
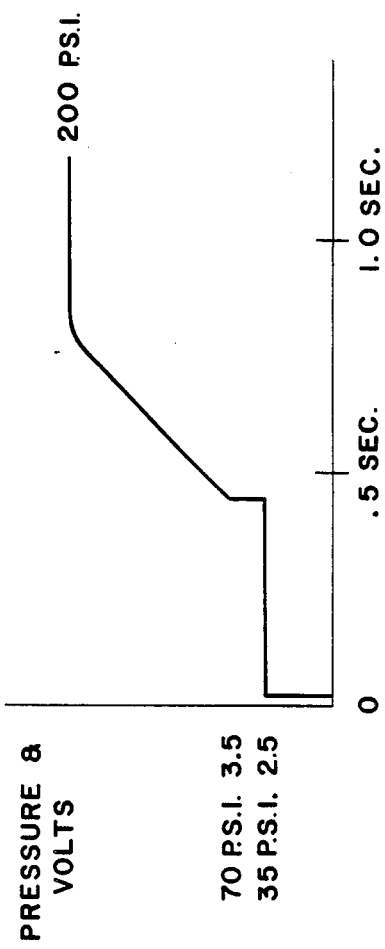
Figure 3:
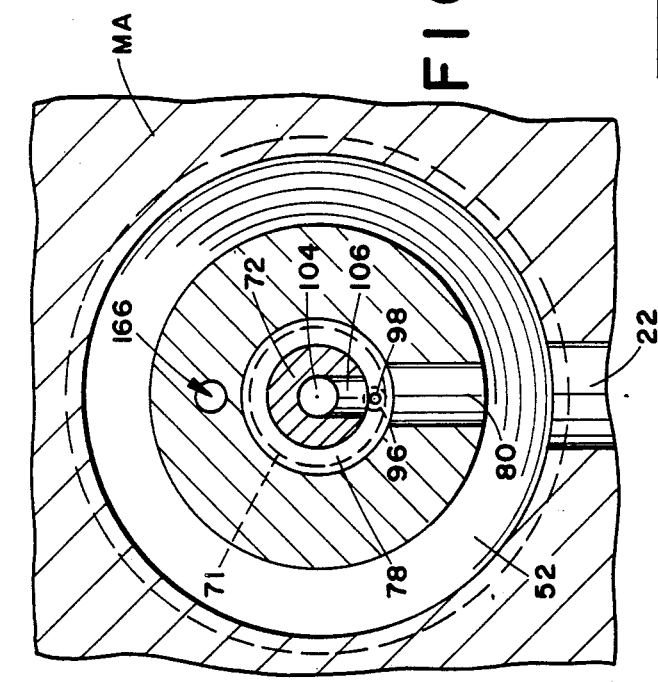
FIG. 3 is a schematic hydraulic circuit diagram of the valve.

In accordance with the invention, the power source PS, has a nominal output of 12 volts which output feeds through a voltage control VC controlled by a timer T such that the voltages applied to the solenoid S will be as shown in FIGS. 4 & 5, namely on the order of 2.5 volts for a predetermined time period of approximately 0.4 of a second, then immediately up to 3.5 volts, and, then ramped upwardly to maximum in a time period of just under 0.6 seconds. The pressure regulating valve has characteristics that; at 2.5 volts, its inlet pressure will be 35 pounds per square inch; giving a flow rate to the clutch of 8 gallons per minute; at 3.5 volts, the inlet pressure will be 70 lbs. per sq. in., giving a flow rate to the clutch plates of 2 gallons per minute. Once the plates are in engagement, the flow rate drops to substantially zero, then as the solenoid S is further energized the pressure rises, proportionately up to the maximum supplied by the pump, which in the preferred embodiment is on the order of 200 lbs. per sq. in.

These times, pressures, voltages and flow rates are all illustrative and can be varied to suit the individual needs of the clutch being controlled. Some clutches will require less time to pick up the slack. Also, the slope of the ramp can be varied to suit the individual clutch or the conditions under which it will be operating.

Thus it will be seen that a valve has been described in which accomplishes all the objects of the invention and others and provides a valve which enables the rapid bringing together of the clutch plates, then a slower movement until full engagement, and, then a controlled bringing of the plates into a controlled maximum pressure engagement.

The invention has been described with reference to a preferred embodiment. Obviously, modifications and alterations will occur to others upon reading and understanding of this specification and it is my intention to include all such modifications and alterations insofar as they come within the scope of the invention.

Having described my invention, I claim:

1. In a shiftable gear transmission having a hydraulic pump, a tank and a hydraulic pressure actuated clutch; means for automatically operating said clutch including in combination;
    a. a three position, pressure actuated three-way directional valve;
    b. an electrically proportional and controlled pressure relief valve;
    c. said valves defining an intermediate pressure chamber the pressure in which actuates said directional valve to its various positions;
    d. said directional valve including;
        1. a control piston having a first position communicating the clutch to tank and the pump to said chamber through a restrictive passage;
        2. a second position communicating the pump fully to the clutch and to said chamber through a restrictive passage and,
        3. a third position communicating both the clutch and the pump through separate restrictive passages to said chamber;
    e. spring means biasing said piston to said first position;
    f. said relief valve providing;
        1. when electrically unenergized, a minimum intermediate pressure;
        2. when partially electrically energized, an intermediate pressure sufficient to actuate said piston to said second position; and,
        3. when more fully energized, an intermediate pressure sufficient to actuate said control piston to said third position.

2. The combination of claim 1 including;
    a. a variable voltage electric power source for energizing said relief valve; and, b. timing means controlling the output of said source to supply;
1. first a low voltage sufficient to move said piston to said second position for a predetermined time period;
2. then a higher voltage sufficient to move said flow valve to said third position and then to ramp said higher voltage upwardly to ramp the pressure on said clutch upwardly.

3. The valve of claim 1 wherein said control piston is in the form of a spool defining a chamber which:
   a. in the first position communicates with the pump and orifice means communicates said chamber with the inlet of said pressure regulating valve;
   b. in the second position communicates the clutch with the pump whereby fluid flows from the pump to the clutch; and,
   c. in the third position communicates the clutch through orifice means with the inlet of said regulating valve.

4. In a shiftable gear transmission having a hydraulic pump, tank, and a hydraulic pressure actuated clutch, means for automatically operating said clutch including in combination;
   a. an electrically proportional and controlled pressure regulating valve,
   b. a three position, pressure actuated, three way directional valve operatively associated with said regulating valve such that its position is dependent on the pressure regulated by said valve;
   c. restricted means communicating said pump to the inlet of said regulating valve;
   d. said directional valve including a control piston having
      1. a first position communicating the clutch to tank;
      2. a second position fully communicating the clutch to the pump to obtain full flow to and rapid closure of the clutch; and,
      3. a third position communicating the clutch to the inlet of said pressure regulating valve through a flow restricting passage whereby the pressure on said clutch will be generally the same as the regulated pressure; and,
   e. means for variably energizing said regulating valve.

5. The combination of claim 4 wherein said energizing means includes a variable voltage electric power source for said regulating valve and timing means controlling the output voltage thereof to supply;
   a. a first low voltage whereby said directional valve is in the first position;
   b. a second higher voltage sufficient to move said directional valve to said second position and for a predetermined time period;
   c. a third higher voltage sufficient to move said directional valve to said third position in a minimum time period; and,
   d. a fourth ramped upwardly voltage to ramp upwardly the hydraulic pressure on said clutch to a maximum.

* * * * *